Dec. 31, 1929.  H. D. KLEINSCHMIDT  1,742,037
ADJUSTABLE MOTOR VEHICLE SEAT
Filed Oct. 23, 1926
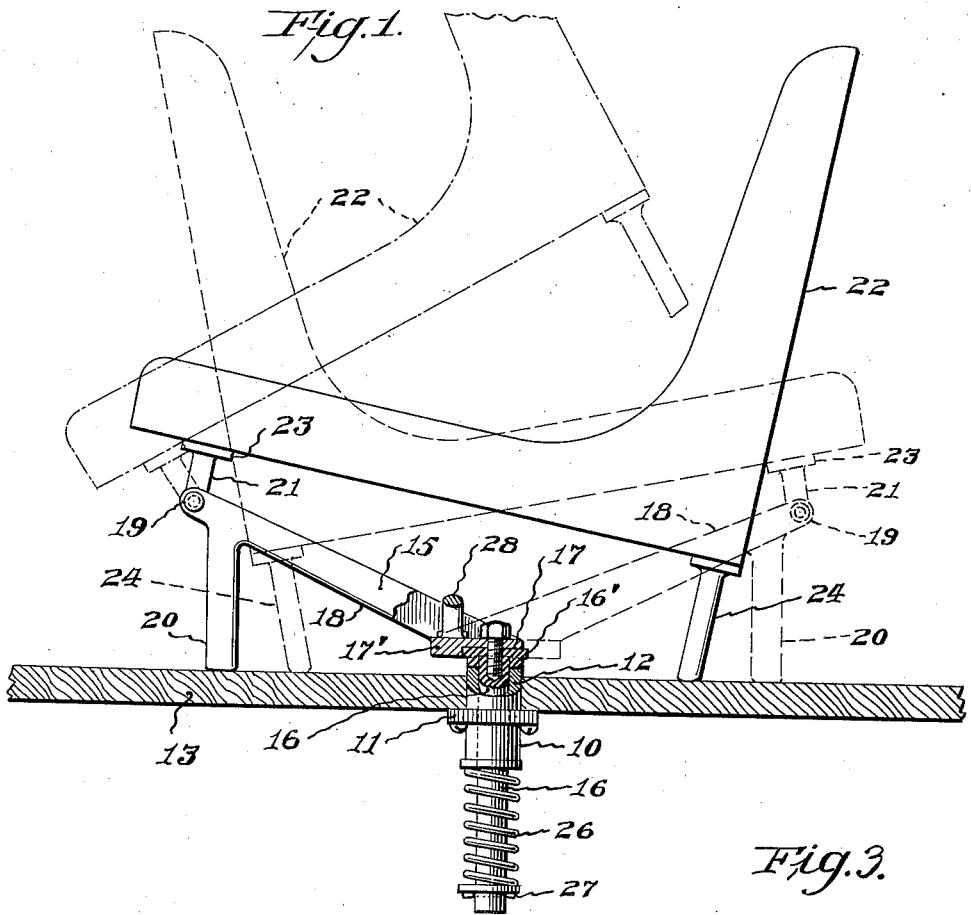
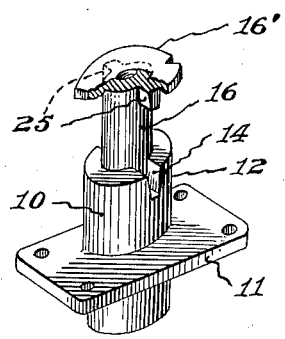
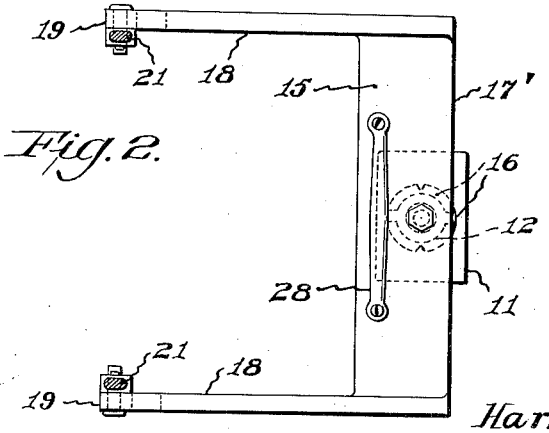
Harry D. Kleinschmidt,
INVENTOR
BY Victor J. Evans
ATTORNEY
WITNESS:

Patented Dec. 31, 1929

1,742,037

UNITED STATES PATENT OFFICE

HARRY D. KLEINSCHMIDT, OF WESTMONT, NEW JERSEY

ADJUSTABLE MOTOR-VEHICLE SEAT

Application filed October 23, 1926. Serial No. 143,665.

This invention relates to motor vehicle seats, and more particularly to a reversible front seat structure which occupies the usual floor space adjacent to the seat occupied by the person operating the vehicle.

The principal object of the invention is to provide a front seat and supporting structure therefor, which is especially designed for use upon automobile bodies, wherein it is frequently desirable to have one or more of the seats reversible, so that the occupant of the seat adjacent to the vehicle operator, may face either forward or backward. This feature is highly desirable, since it will permit the occupant of the seat specified, to carry on a conversation with the occupants of the rear seat, without the usual necessity of turning the head toward the rear seat, to do so.

A further object of the invention is to provide a seat and supporting structure therefor, which is simple and efficient in construction, cheap to manufacture and particularly adapted to be readily reversed from front to rear and vice-versa, in a convenient and practical manner.

A further object of the invention is to provide a seat and supporting structure therefor as specified, which is further provided with hinged means, so that the seat supported by and attached to the device, may be turned over in a forward manner, when not in use, to provide an unobstructed entrance into the vehicle, particularly in small motor vehicles of the two-door variety.

Other objects of the invention will appear in the following detail description, and in the accompanying drawing, wherein:

Figure 1 is a side elevation of the improved seat structure in forward position, illustrating the manner of attachment to the floor of a motor vehicle, and with the reversed position of the seat indicated in dotted lines.

Figure 2 is a top plan view of the seat supporting structure, with the seat shown in a forwardly adjusted out-of-the-way position.

Figure 3 is a detail sectional view on the line 3—3, of Fig. 2.

Referring more particularly to the drawing, the improved reversible seat and supporting structure therefor, comprises a cylindrical bearing support 10, having an annular flange 11, intermediate its ends, and with the upper portion 12, of said bearing support adapted to be vertically disposed through an aperture in the floor 13, of a vehicle, from the underside thereof, and secured to said floor by means of the flange 11, and suitable screw bolts positioned through said flange and floor.

The upper end 12, of the bearing support 10, which projects through the vehicle floor 13, is provided with a pair of oppositely disposed rectangular recesses 14, which are cut downwardly from the top edge thereof for receiving a like number of lugs hereinafter described, in locked position.

Journaled in the bearing support 10, is a seat supporting frame generally indicated at 15, and which comprises a stub shaft 16, provided with an annular flange 16' at its upper end, and adapted to seat in a recess 17, therefor, formed on the underside and intermediate the ends of a horizontally disposed cross head 17', forming a part of the seat supporting frame 15, and secured thereto in a rigid depending manner, by means of a suitable screw bolt. A pair of angular upwardly extending parallel side arms 18, are formed integrally with and extend laterally in an inclined manner, from the front corners of the cross head 17', as clearly shown in Fig. 2, of the drawing. The said parallel side arms 18, terminate with an apertured hinge piece 19, at the free ends thereof, and with a supporting leg 21, integrally formed thereon and depending from each of the said side arms 18, adjacent the apertured hinge pieces 19, to form the front supporting legs for the frame 15, as clearly shown in Fig. 1, of the drawing.

Pivoted to the hinge pieces 19, on the free ends of the side arms 18, are a pair of brackets 20, adapted to have their free ends secured to the front underside surface of the seat 22, by means of the foot plates 23, formed integrally therewith. A pair of relatively short supporting legs 24, are secured to the underside of the seat 22, adjacent the rear edge thereof, for normally supporting the seat 22, in an inclined position.

In order to lock the seat supporting frame 15, in a fixed forward or rearwardly facing position, I have provided a pair of rectangular lugs 25, which are oppositely disposed on the underside of the flange 16', centrally therewith, and with the upper end portion of the stub shaft 16, positioned between said lugs 25, and integrally with said flange and lugs, said lugs 25, being adapted to seat in the recesses 14, for preventing the rotation of the seat supporting frame 15, after the same has been properly positioned.

In order to permit the withdrawal of the lugs 25, out of the recesses 14, prior to reversing the seat structure 15, I have extended the stub shaft 16, below the lower end of the bearing support 10, for placement on the depending end thereof, of a suitable coil spring 26, and retained thereon by means of washer, and cotter pin through the end of said shaft.

A suitable gripping handle 28, is provided on the top surface of the cross head 17', centrally over the bearing support 10, to permit an upward movement of the shaft 16, through the bearing support, sufficient for the lugs 25, to clear the recesses 14.

From the foregoing description taken in connection with the accompanying drawing, it will be readily apparent to those skilled in the art, that when it is desired to reverse a seat constructed in accordance with my invention, it is only necessary to raise the seat 22, on its front pivoted end sufficiently so that the handle 28, may be taken hold of, and with an upward pull, withdraw the lugs 25, out of the recesses 14, by drawing the shaft 16, upwardly through the support 10, and then rotating the seat and structure 15, until the seat is placed in the desired position.

What I claim is:

The combination with a vehicle body including the floor thereof, a tubular bearing support vertically disposed through said floor, flange means formed on said bearing support for the attachment thereof to said floor, a seat and supporting structure therefor having a depending shaft journaled in said bearing support and comprising a cross head member formed integrally with said shaft in T formation and having angular upwardly extending parallel side arms formed with and at the ends of said cross head member, supporting legs formed with and depending from said side arms adjacent the free ends thereof, a pair of spaced hinge brackets secured to the front underside surface of said seat with the depending ends thereof pivoted to the free ends of said arms, supporting means secured to and depending from the rear underside surface of said seat for normally maintaining said seat in an inclined position, means associated with said cross head and bearing support for normally locking said shaft and seat structure against rotation, and spring means carried by the depending free end of said shaft for returning said lock-means into engagement upon the rotations of said seat supporting structure.

In testimony whereof I affix my signature.

HARRY D. KLEINSCHMIDT.